US010210053B2

(12) United States Patent
Naik et al.

(10) Patent No.: US 10,210,053 B2
(45) Date of Patent: *Feb. 19, 2019

(54) SNAPSHOTS AT REAL TIME INTERVALS ON ASYNCHRONOUS DATA REPLICATION SYSTEM

(71) Applicant: International Business Machines Corporation, Armonk, NY (US)

(72) Inventors: Manoj P. Naik, San Jose, CA (US); Ravindra R. Sure, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/942,613

(22) Filed: Apr. 2, 2018

(65) Prior Publication Data
US 2018/0225180 A1 Aug. 9, 2018

Related U.S. Application Data

(63) Continuation of application No. 15/213,463, filed on Jul. 19, 2016, now Pat. No. 9,983,947.

(51) Int. Cl.
G06F 12/00 (2006.01)
G06F 11/14 (2006.01)
G06F 3/06 (2006.01)

(52) U.S. Cl.
CPC .......... *G06F 11/1464* (2013.01); *G06F 3/061* (2013.01); *G06F 3/0605* (2013.01);
(Continued)

(58) Field of Classification Search
CPC ...... G06F 3/065; G06F 3/0619; G06F 3/0683; G06F 12/0868; G06F 2212/1032;
(Continued)

(56) References Cited

U.S. PATENT DOCUMENTS 7,644,046 B1 1/2010 Keeton et al.
8,332,354 B1 12/2012 Chatterjee et al.
(Continued)

OTHER PUBLICATIONS

Naik et al., "Snapshots at Real Time Intervals on Asynchronous Data Replication System," U.S. Appl. No. 15/213,463, filed Jul. 19, 2016.
(Continued)

*Primary Examiner* — Matthew Bradley
(74) *Attorney, Agent, or Firm* — Scott S. Dobson

(57) ABSTRACT

A moving weighted average of application bandwidth is calculated based on updates to a first data storage by a first data site. A moving weighted average of transmission bandwidth is calculated based on replication of the updates to a second data storage via a second data site. A next coordinated consistency point is identified and the time remaining before the next consistency point is calculated. An amount of the updates that can be replicated before the next consistency point is determined based on the average transmission bandwidth. A prediction of an amount of additional updates that will be generated on the first data site before the next consistency point is made using heuristics based on the average application bandwidth. When update accumulation combined with the prediction exceeds the amount of updates that can be replicated before the next consistency point, pending updates are flushed to the second data storage.

15 Claims, 5 Drawing Sheets

(52) U.S. Cl.
CPC .............. *G06F 3/065* (2013.01); *G06F 3/067* (2013.01); *G06F 3/0619* (2013.01); *G06F 3/0647* (2013.01); *G06F 3/0659* (2013.01); *G06F 3/0689* (2013.01); *G06F 11/1461* (2013.01); *G06F 2201/805* (2013.01); *G06F 2201/82* (2013.01); *G06F 2201/84* (2013.01)

(58) Field of Classification Search
CPC ......... G06F 2212/261; G06F 2212/283; G06F 2212/313
See application file for complete search history.

(56) References Cited

U.S. PATENT DOCUMENTS

| | | |
|---|---|---|
| 8,548,949 B2 | 10/2013 | Jennas, II et al. |
| 9,063,997 B2 | 6/2015 | Clayton et al. |
| 9,110,918 B1 | 8/2015 | Rajaa et al. |
| 2007/0106857 A1 | 5/2007 | Koning et al. |
| 2014/0201046 A1 | 7/2014 | Farajun et al. |
| 2014/0236891 A1 | 8/2014 | Talius et al. |

OTHER PUBLICATIONS

List of IBM Patents or Patent Applications Treated as Related, dated Mar. 30, 2018, 2 pages.

SNAPSHOTS AT REAL TIME INTERVALS ON ASYNCHRONOUS DATA REPLICATION SYSTEM

BACKGROUND

The present disclosure relates to taking real-time snapshots, and more particular aspects relate to taking real-time snapshots on a system using asynchronous replication.

Many modern computing systems use multiple storage locations, both for different type of storage and for the security provided by distributed storage. Types of storage may include short-term, or working, storage, long-term, or primary, storage, and backup, or secondary, storage. Data items may generally be replicated from short-term to long-term storage, or long-term to backup storage. This replication may occur in real-time, or as data items are generated, but asynchronous replication, where data items are replicated out of order may be held in a queue to allow for optimization, is often advantageous. Optimizations include coalescing redundant data items, canceling data items rendered irrelevant by more recent data items, etc.

SUMMARY

Disclosed herein are embodiments of a method, computer program product, and computer system for taking real-time snapshots.

According to embodiments of the present disclosure, a moving weighted average of application bandwidth is calculated based on updates to a first data storage made by a first data site. A moving weighted average of transmission bandwidth is calculated based on replication of the updates to a second data storage by a second data site in communication with the first data site.

A next pending coordinated consistency point is identified and the time remaining before the next consistency point is calculated. An amount of the updates that can be replicated in the time remaining before the next consistency point based on the average transmission bandwidth is determined. A prediction is made, using heuristics based on the average application bandwidth, of an amount of additional updates that will be generated on the first data site in the time remaining before the next consistency point.

When pending updates, accumulating in a queue awaiting for replication, combined with the prediction of update generation on the first data site exceeds the amount of the updates that can be replicated before the next consistency point, then pending updates in the queue are flushed to the second data storage.

According to embodiments of the present disclosure, a computer system, having a memory and a processor in communication with the memory, calculates a moving weighted average of application bandwidth based on updates to a first data storage made by a first data site. The system calculates a moving weighted average of transmission bandwidth based on replication of the updates to a second data storage made by a second data site in communication with the first data site.

The system identifies a next pending coordinated consistency point and calculates the time remaining before the next consistency point. The system determines an amount of the updates, which may be pending in a queue awaiting replication, that can be replicated before the next consistency point based on the average transmission bandwidth. The system makes a prediction, using heuristics based on the average application bandwidth, of an amount of additional updates that will be generated on the first data site before the next consistency point.

The system flushes updates pending in the queue to the second data storage when the accumulation of updates in the queue, combined with the prediction of update generation on the first data site, exceeds the amount of the updates that can be replicated before the next consistency point.

According to embodiments of the present disclosure, a computer program product is described for taking real-time snapshots. The computer program product may be a computer readable storage medium having program instructions embodied therewith, wherein the computer readable storage medium is not a transitory signal per se, and the program instructions executable by a processor to perform the method described.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
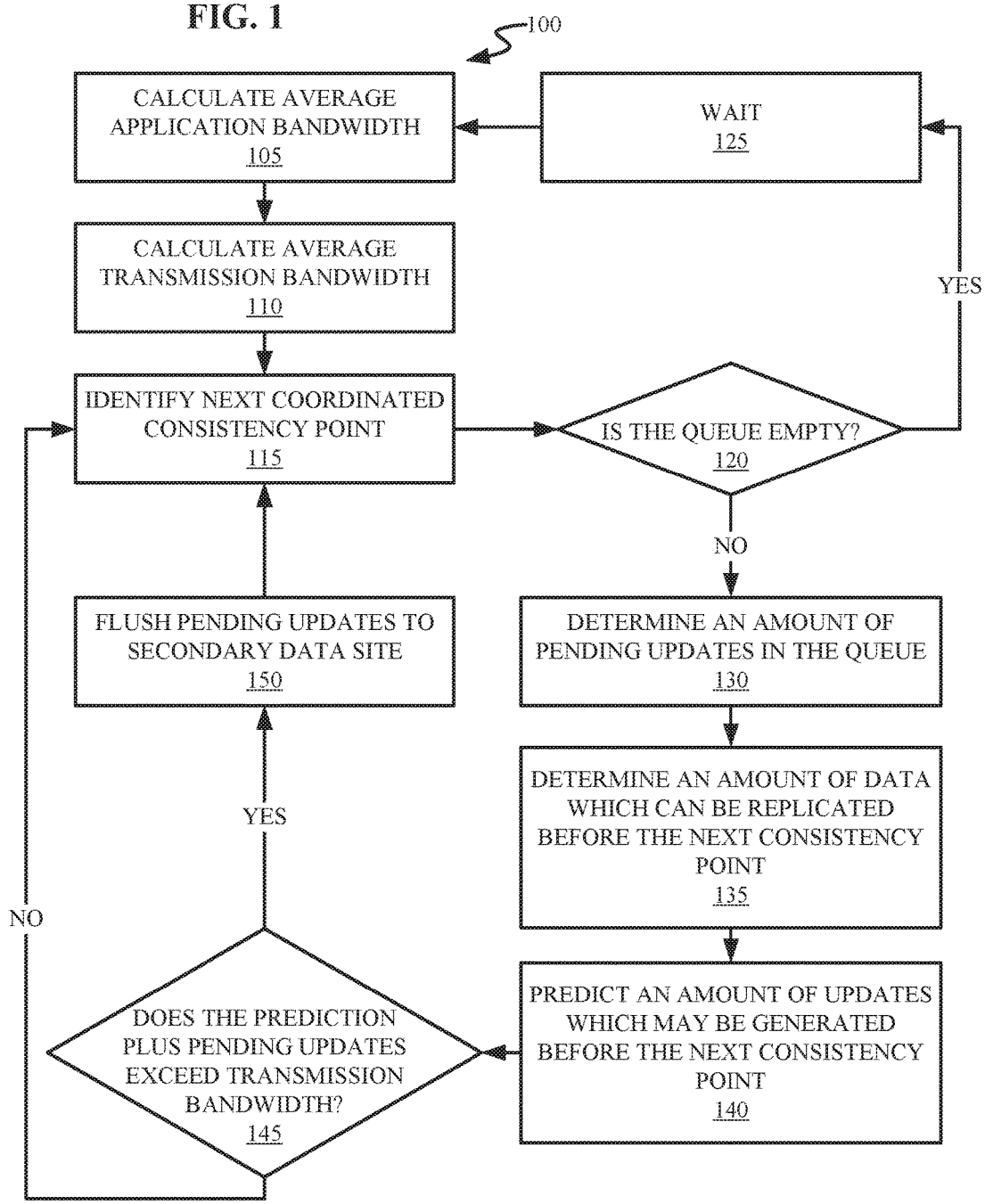
FIG. 1 depicts a flowchart of an example method of preparing a first and second data storage for peer snapshots, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to taking real-time snapshots, more particular aspects relate to taking real-time snapshots on a system using asynchronous replication. While the present disclosure is not necessarily limited to such applications, various aspects of the disclosure may be appreciated through a discussion of various examples using this context.

In business continuity planning, a recovery point objective (RPO) describes the maximum allowable data loss from a service or device failure as a period of time. It describes, in time, the maximum amount of data a user is willing to lose for a given event. In practice, the RPO interval may be used as a guideline when setting up periodic backups for data generated. For example, if a given system has an RPO interval of four hours, then periodic four-hour backups may be a desirable feature of the system, so that regardless of when an event occurs, no more than four hours' worth of data may be lost. These backups may be taken as snapshots of the system at the time the RPO interval expires. A snapshot may generally be a recording of the content of a data site and/or a data storage at a particular time. Some systems may use markers to signal to the system when an RPO snapshot is due; such markers may be referred to as coordinated consistency points. In general, the time elapsed between any two successive consistency points may be defined by a RPO interval, though the time between any two consistency points may be set according to other considerations, e.g. a shorter interval may be desired for especially sensitive work, or a longer interval for relatively static systems.

In systems where new data is written to a secondary storage (a primary backup) in real-time or almost real-time, the primary and secondary storage may generally be uniform at the time a snapshot is due. However, it far more common for data to be written to secondary storage asynchronously to allow for network optimization before replication to the secondary storage (e.g., coalescing messages with the same call, canceling messages indicating changes that have been overwritten while the message was in queue, etc). In such a case, updates may be held in queue, such as at a network gateway between the data site generating the updates and a network transmitting the updates to the secondary storage, awaiting replication to the secondary storage. This may complicate the process of taking RPO snapshots as the secondary storage may not be caught up with the primary storage at the time of the consistency point due to this 'synchronization lag'. This may result in the secondary storage being 'inconsistent' with the primary storage at any given time, which is undesirable for the RPO snapshots.

To overcome the contrasting requirements of synchronization lag and the RPO interval, disclosed herein are embodiments of a method of monitoring data transmittal to the secondary storage and "flushing" data through when necessary to provide uniformity between the primary and secondary storage at the time of the RPO snapshot.

Referring now to FIG. 1, a flowchart of an example method 100 of preparing a first and second data storage for consistent peer snapshots by making the two data sites uniform is depicted.

An average application bandwidth may be calculated, as in operation 105. Application bandwidth may generally be the rate at which updates are generated by the first data site and stored in a first data storage. There may be numerous means for determining the application bandwidth, but it may generally be determined by tracking the storage of new data and data changes in the first data storage. In some embodiments, application bandwidth may be determined using a formula, e.g., Data Stored/(Current Time−Start Time). In general, application bandwidth may be periodically recalculated, to provide a moving average.

An average transmission bandwidth may be calculated, as in operation 110. Transmission bandwidth may generally be the rate at which updates generated at the first data site are replicated to the second data site and stored in a second data storage. In embodiments, transmission bandwidth may generally be determined by tracking data sent to the second data site for storage in the second data storage. It may, in some embodiments, be determined by use of a formula, e.g. Data Replicated/Time to Replicate. Like application bandwidth, transmission bandwidth may be periodically recalculated to provide a moving average.

A coordinated consistency point may be identified, as in operation 115. Consistency points may be set in numerous ways provided that they are spaced according to the RPO interval. For example, in some embodiments, coordinated consistency points may be queued at the gateway of the first data site, and the remaining time until the next consistency point may be calculated as necessary. In other embodiments, an interval timer may be reset at each consistency point and maintain a countdown until the next snapshot is due.

A queue of updates pending for replication may be assessed to determine whether the queue is empty, as in decision block 120. If the queue is empty then a waiting period may begin, as in operation 125, before recalculating the average application bandwidth, as in operation 105. In systems utilizing asynchronous replication, a pending queue of updates to be replicated to the secondary site may generally be held at a gateway of the first data site to allow for optimization before replication.

If the queue is not empty, the queue may be assessed to determine the amount of updates pending in the queue, as in operation 130. A determination may also be made of an amount of updates that can be replicated to the second data site before the next consistency point based on the average transmission bandwidth, as in operation 135.

A prediction may be made of an amount of additional updates that will be generated on the first data site before the next consistency point, as in operation 140, using heuristics and based on the average application bandwidth. As an example, the time of the next consistency point may be known and stored as the variable $T_n$ and the current time may be identified and stored as the variable $T_i$. In this case, the predication may calculated using:

$$R_x(T_n-T_i)$$

where $R_x$ is the average application bandwidth. Combined with an amount D—the amount of data pending in the queue—the amount of data needed to be replicated before the next consistency point may be calculated as:

$$D+R_x(T_n-T_i).$$

The combined amount from the prediction and the pending updates in the queue may be compared to the amount of data that may be replicated before the next consistency point, as in decision block 145. If the prediction plus the updates in the queue do not exceed the transmission bandwidth, the amount of pending updates in the queue may be reassessed, as in operation 130. This determination may be made by numerous means, and in some embodiments may utilize simple calculations. For example, the amount of data that could be replicated prior to the consistency point could be calculated as:

$$B_w(T_n-T_i)$$

where $B_w$ is the calculated average transmission bandwidth. This value may be compared with the $[D+R_x(T_n-T_i)]$ value referenced above to determine if the transmission bandwidth is sufficient to replicate all data pending and generated prior to the consistency point. As another option, the value $D+R_x(T_n-T_i)$ may be divided by the transmission bandwidth as:

$$[D+R_x(T_n-T_i)]/B_w$$

to yield a time value. The time value may be compared with the time remaining until the next consistency point $(T_n-T_i)$ to determine if enough time remains before the consistency point for the transmission bandwidth to replicate the pending and generated data.

If the prediction plus the pending updates in the queue do exceed the capacity of the transmission bandwidth in the time remaining before the next consistency point, then the pending updates in the queue may be flushed to the secondary data site, as in operation 150. The time of the next coordinated consistency point may be again assessed, as in operation 115.

Figure 2:
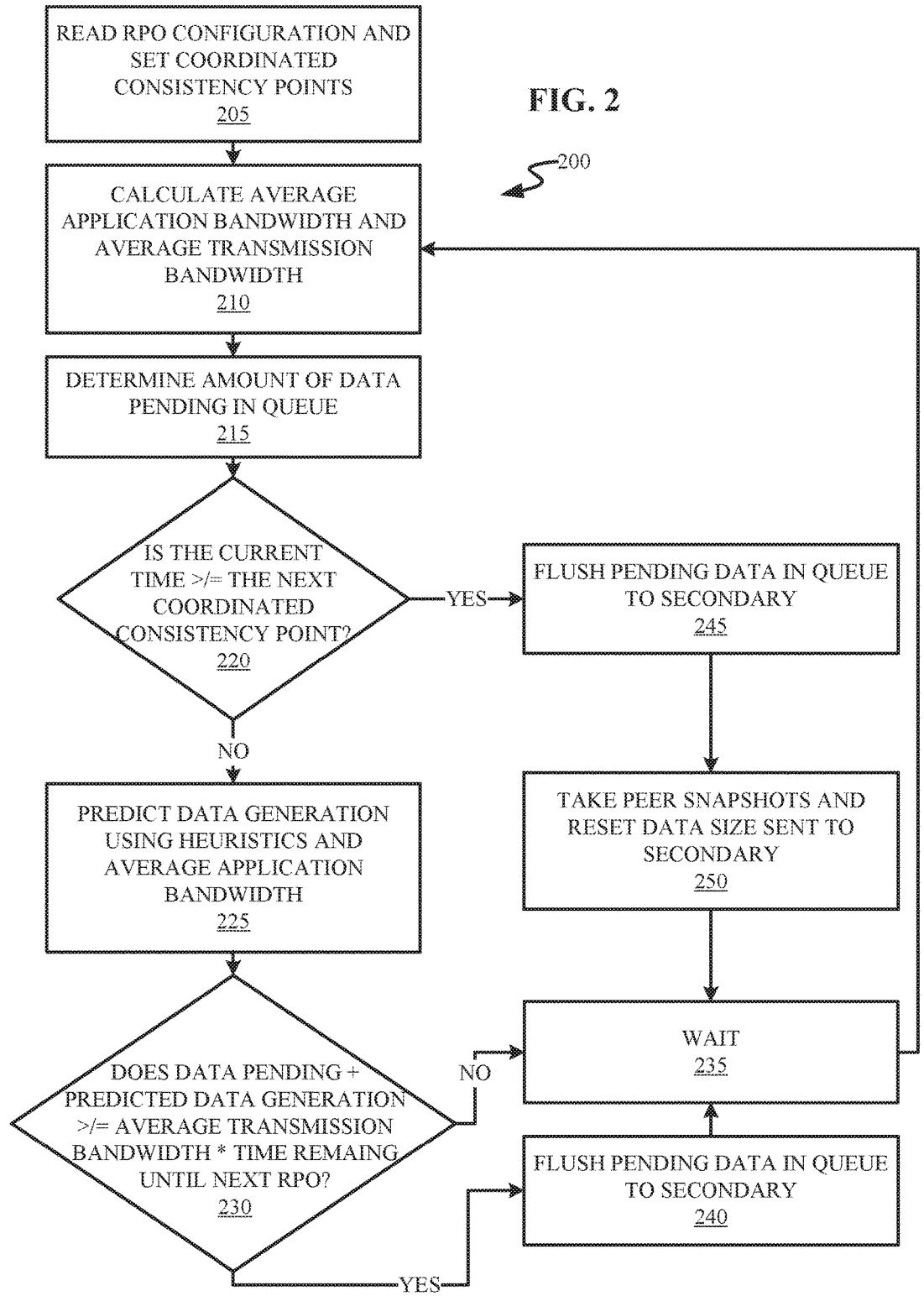
FIG. 2 depicts a flowchart of an example method of taking snapshots of a first and second data site, according to embodiments of the present disclosure.

Referring now to FIG. 2, an example method 200 of taking uniform snapshots of a first and second data site is depicted, according to embodiments of the present disclosure.

The system's RPO configuration may be read, as in operation 205. The RPO configuration may be used to set queued coordinated consistency points, an interval timer, or any other means of ensuring that the periodic backups occur at the proper interval.

The average application bandwidth and average transmission bandwidth, discussed in more detail above (ref. FIG. 1), may be calculated, as in operation 210.

The amount of data pending in the queue to the second data site may be determined as in operation 215.

The current time may be compared to the RPO configuration to determine if the next coordinated consistency point has been reached, as in decision block 220.

If the next coordinated consistency point has not been reached, a prediction of an amount of data that may be generated by the first data site before the next coordinated consistency point may be made using heuristics and the calculated average application bandwidth, as in operation 225. This prediction may be added to the determined amount of data pending in the queue to determine a total amount of data that is to be replicated to the second data site. It may be determined whether the total amount of data to be replicated exceeds the amount of data the calculated average transmission bandwidth may replicate in the time remaining before the next coordinated consistency point, as in decision block 230.

If the amount of data pending plus the prediction does not exceed the amount of data which may be replicated before the next coordinated consistency point based on the calculated average transmission bandwidth, a wait period may be initiated, as in operation 235. The average application and transmission bandwidths may also be recalculated, as in operation 210, providing moving averages.

If the amount of data pending plus the prediction does exceed the amount of data which may be replicated before the next consistency point based on the calculated average transmission bandwidth, then the data pending in the queue may be flushed to the second data site, as in operation 240. After flushing the queue, a wait period may be initiated, as in operation 235. The wait period may be set by the user, set by a third-party system, or default to a value according to the system settings or the RPO configuration.

The average application and transmission bandwidths may also be recalculated, as in operation 210, providing moving averages.

If, at decision block 220, the current time if found to match or exceed the time for the next coordinated consistency point, then the data pending in the queue may be flushed to the second data site, as in operation 245. Once the data is flushed to the second data site, a verification (not shown) may be performed to ensure that the first and second data storage are uniform before taking a snapshot of both the first and second data storage, as in operation 250. The verification, if performed, and snapshots may generally be taken at the time of the coordinated consistency point. The verification may consist of comparing the last replicated data item to the last item stored in the first data storage, or may more thoroughly vet several of the last replicated/stored data items, or may use some other means to verify that all data items stored in the first data storage have also be replicated to the second data storage.

A wait period may be initiated, as in operation 235, and the average application and transmission bandwidth recalculated, as in operation 210.

Figure 3:
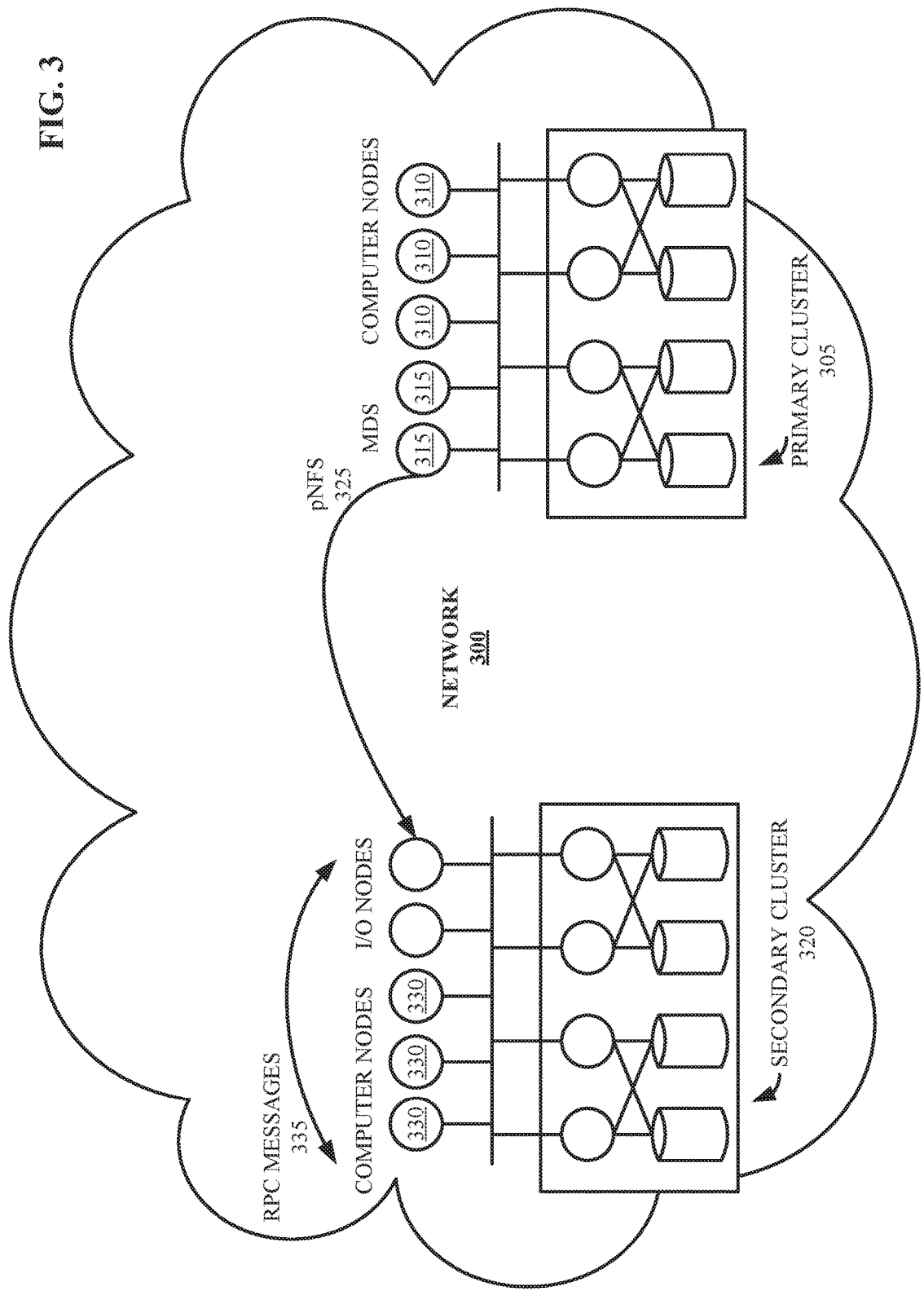
FIG. 3 depicts an example system which may execute the method described herein, according to embodiments of the present disclosure.

Referring now to FIG. 3, an example of system which may execute the method described herein is depicted, according to embodiments of the present disclosure.

The primary cluster 305 may represent any device or group of devices used to generate data, as well as the storage means used by that device, or devices. A device may be a desktop or laptop computer, a tablet, a mobile phone, a virtual machine, etc. As an example, FIG. 3 uses computer nodes 310 to represent data generating devices in the primary cluster. Data generated by the nodes 310 may be organized in numerous ways. For example, FIG. 3 depicts nodes that are organized as metadata servers (MDS) 315. It is to be understood that the depicted organization of nodes as MDS 315 as in FIG. 3 is to be non-limiting, as other possible organizations/configurations are possible. The MDS 315 may generally sort and store data used for classifying and retrieving data objects generated by the nodes 310. The primary cluster 305 generally also includes a primary storage, and the rate at which data is generated by the nodes 310 and stored in the primary storage would be the average application bandwidth of the primary cluster 305.

A secondary storage, to which data objects generated by the primary nodes 310 may be replicated, is generally located in a secondary cluster 320. Data objects generated on the primary cluster 305 and identified for replication to the secondary cluster 320 by the MDS 315 may be replicated via a network 300. Objects to be replicated may be transferred and queued by any known means. For example, in FIG. 3, the primary cluster 305 and the secondary cluster 320 are in a parallel network file system (pNFS) 325, and data generated in the primary nodes 310 may be replicated to the secondary storage in the secondary cluster 320 via the pNFS 325.

Messages sent via the network 300 may be received by the secondary cluster 320 as remote procedure call (RPC) messages 335, such as in an embodiment where the secondary cluster primarily functioned as a remote storage. The network 300 may be a cloud network. Messages may be managed at the secondary cluster 320 by computer nodes 330.

The method may be carried out in full by any of the computer nodes 310 in the primary cluster 305, or by a third-party device which may access the primary cluster 305 via the network 300. An example of device or system which may execute the method described herein as part of the primary cluster or via the network is depicted in FIG. 4.

Figure 4:
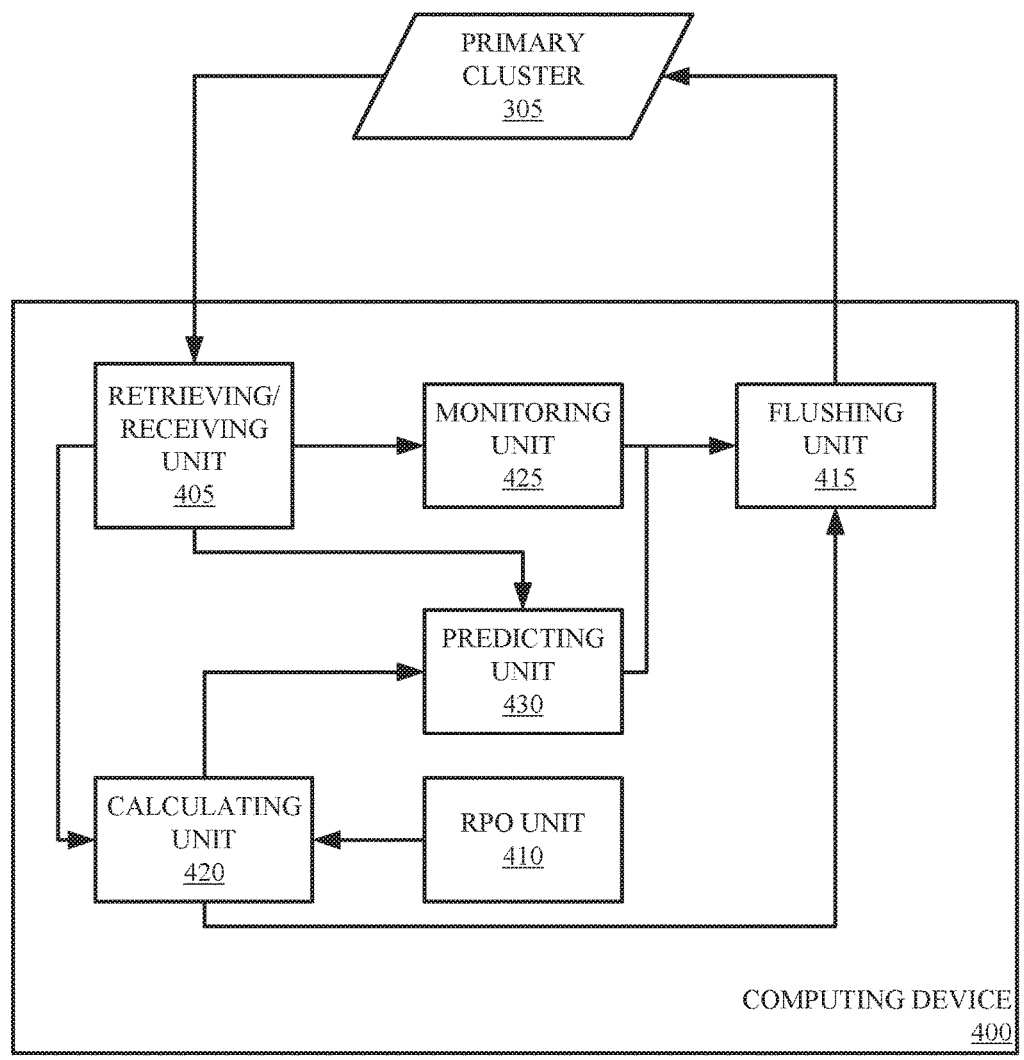
FIG. 4 depicts an example computing device which may execute the method described herein, according to embodiments of the present disclosure.

Referring now to FIG. 4, an example computing device 400 is shown. A computing device 400 may be any type of stationary or mobile computing device, including a desktop computer, a mobile computer, a laptop computer, a notebook computer, a tablet computer, a mobile phone, or another type of mobile device or a virtual machine. It may be a server. As a server it may be implemented in one or more computer systems, including one or more servers, which may be any type of computing device described herein or otherwise known that is capable of enabling the corresponding functionality described herein. It may be an integrated part of the primary cluster or an independent machine or system connected via the network.

The computing device 400 may have a retrieving/receiving unit 405 to retrieve and receive data from the primary cluster 305. The retrieving/receiving unit 405 may collect and distribute data such as: the number of updates stored in the primary storage, the time each update was stored in the primary storage, the number of updates pending for replication at the gateway of the primary cluster, the system's RPO configuration, the current time, the time each pending update is replicated out of the queue and sent to the secondary cluster, the time each pending update is added the queue, etc. The retrieving/receiving unit 405 may also distribute data among other units of the computing device 400, or another unit (not shown) may execute such a function.

The monitoring unit 425 may track the number of updates pending in the queue at the gateway of the primary cluster 305. The monitoring unit 425 may be provided with data from the retrieving/receiving unit 405, such as the number of pending updates in the queue at a given time, the current time, the time each pending updates is added to the queue, the time each pending updates replicates out of the queue and is transmitted via the network, etc.

The calculating unit 420 may provide a calculation of the average application bandwidth and/or transmission bandwidth. It may also calculate the time remaining until the next coordinated consistency point. The calculating unit 420 may receive the system's RPO configuration, or the time of the coordinated consistency point itself, from the RPO unit 410, or from the retrieving/receiving unit 405. The calculating unit 420 may also receive from the retrieving/receiving unit 405 data such as: the number of updates added to the primary storage, the time each update is added to the primary storage, the number of updates added to the queue, the number of updates leaving the queue, the time each updates enters/exits the queue, the current time, etc.

The predicting unit 430 may provide a prediction of the number of updates the first data site is likely to generate in the time remaining before a consistency point. The predication unit 430 may make its prediction based on data provided by the retrieving/receiving unit 405 and the calculating unit 420. The predicting unit 430 may receive data such as the number of updates added to the primary storage, the time each update is added to the primary storage, the current time, the time remaining until the next coordinated consistency point, the application bandwidth, etc.

The flushing unit 415 may flush updates pending in the queue if the data it receives indicates that the updates pending plus the updates generated in the time remaining before the next consistency point will exceed the transmission bandwidth. The flushing unit 415 may receive data from the monitoring unit 425, the predicting unit 430, and the calculating unit 420. The data the flushing unit 415 receives may include: the number of updates pending in the queue, the time remaining until the next coordinated consistency point, the transmission bandwidth, the number of updates likely to be generated in the time remaining until the next coordinated consistency point, etc. If the data the flushing unit 415 receives indicates that a flush is necessary, a signal may sent to the primary cluster 305 indicating that any updates pending in the queue at the gateway should be immediately transmitted to the secondary cluster.

Figure 5:
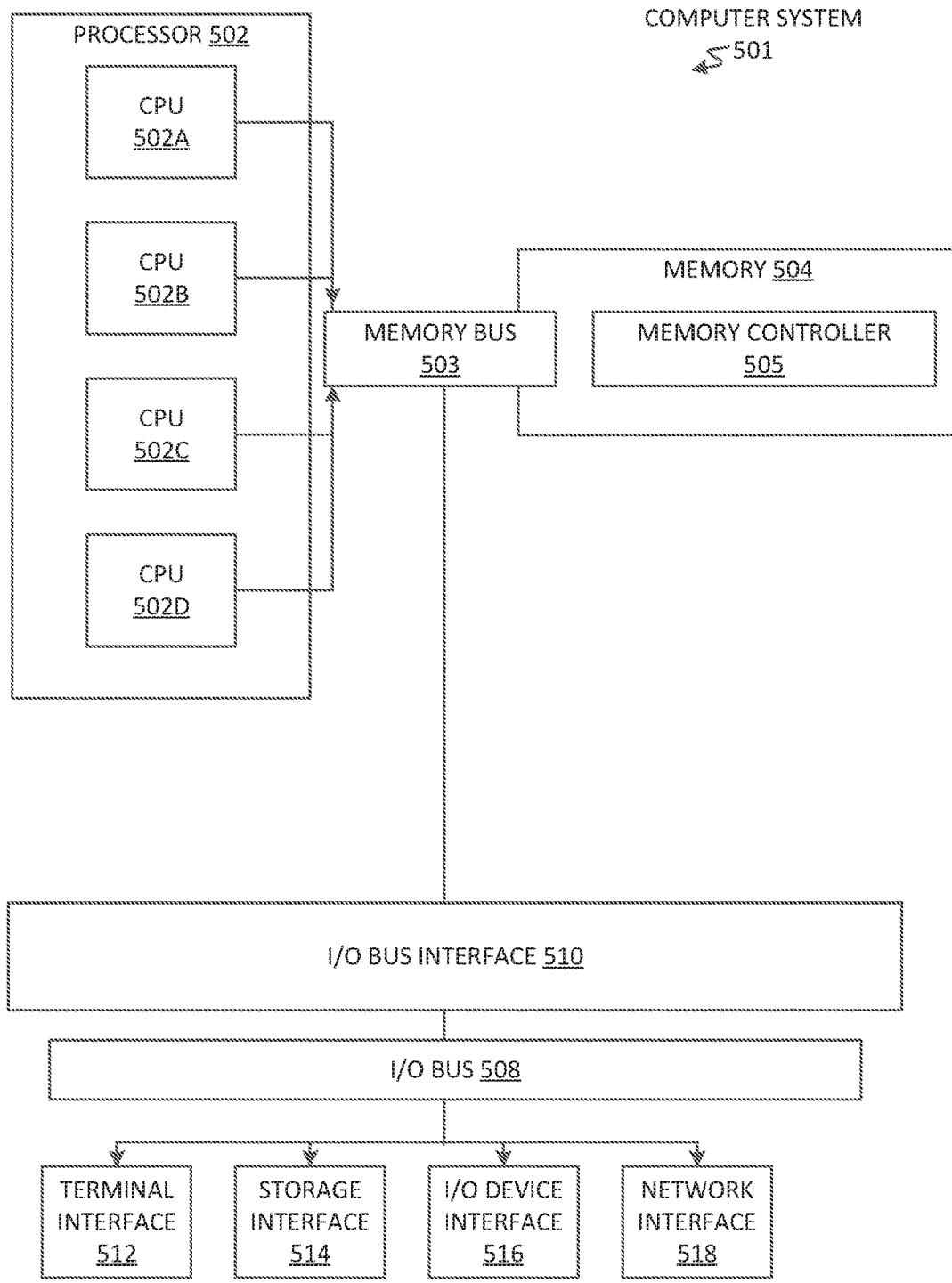
FIG. 5 depicts a high-level block diagram of an example computer system that may be used in executing the method described herein, in accordance with embodiments of the present disclosure.

Referring now to FIG. 5, shown is a high-level block diagram of an example computer system (i.e., computer) 501 that may be used in taking real-time snapshots on a system using asynchronous replication, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple 110 buses 508, or both. Further, while multiple I/O interface units which separate the I/O bus 508 from various communications paths running to the various I/O devices are shown, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for taking real-time snapshots, the method comprising:
    determining a moving weighted average of application bandwidth based on update generation;
    identifying a coordinated consistency point indicating a time at which a snapshot is to be taken;
    determining an amount of updates that can be replicated before the consistency point;
    making a prediction, based on the moving weighted average application bandwidth, of an amount of additional updates that will be generated before the consistency point; and
    flushing pending updates when accumulation of the pending updates combined with the prediction of update generation exceeds the amount of the updates that can be replicated before the next consistency point.

2. The method of claim 1, wherein time elapsed between two successive consistency points is defined by a recovery point objective interval.

3. The method of claim 1, wherein the update generation is by a data site to a first data storage.

4. The method of claim 3, wherein the pending updates are flushed to a second data storage.

5. The method of claim 4, determining an amount of updates that can be replicated before the consistency point is based on a moving weighted average of transmission bandwidth between the first data storage and the second data storage.

6. A computer system for taking real-time snapshots, the computer system comprising:
    a memory; and
    a processor in communication with the memory, wherein the computer system is configured to perform a method, the method comprising:
        determining a moving weighted average of application bandwidth based on update generation;
        identifying a coordinated consistency point indicating a time at which a snapshot is to be taken;
        determining an amount of updates that can be replicated before the consistency point;
        making a prediction, based on the moving weighted average application bandwidth, of an amount of additional updates that will be generated before the consistency point; and
        flushing pending updates when accumulation of the pending updates combined with the prediction of update generation exceeds the amount of the updates that can be replicated before the next consistency point.

7. The system of claim 6, wherein time elapsed between any two successive consistency points is defined by a recovery point objective interval.

8. The system of claim 6, wherein the update generation is by a data site to a first data storage.

9. The system of claim 8, wherein the pending updates are flushed to a second data storage.

10. The system of claim 9, wherein determining an amount of updates that can be replicated before the consistency point is based on a moving weighted average of transmission bandwidth between the first data storage and the second data storage.

11. A computer program product for taking real-time snapshots, the computer program product comprising a computer readable storage medium having program instructions embodied therewith, wherein the computer readable storage medium is not a transitory signal per se, the program instructions executable by a processor to perform a method comprising:
    determining a moving weighted average of application bandwidth based on update generation;
    identifying a coordinated consistency point indicating a time at which a snapshot is to be taken;
    determining an amount of updates that can be replicated before the consistency point;
    making a prediction, based on the moving weighted average application bandwidth, of an amount of additional updates that will be generated before the consistency point; and
    flushing pending updates when accumulation of the pending updates combined with the prediction of update generation exceeds the amount of the updates that can be replicated before the next consistency point.

12. The computer program product of claim 11, wherein time elapsed between any two successive consistency points is defined by a recovery point objective interval.

13. The computer program product of claim 11, wherein the update generation is by a data site to a first data storage.

14. The computer program product of claim 13, wherein the pending updates are flushed to a second data storage.

15. The computer program product of claim 14, wherein determining an amount of updates that can be replicated before the consistency point is based on a moving weighted average of transmission bandwidth between the first data storage and the second data storage.

* * * * *